(12) United States Patent
Zhang

(10) Patent No.: US 9,996,213 B2
(45) Date of Patent: Jun. 12, 2018

(54) APPARATUS FOR A USER INTERFACE AND ASSOCIATED METHODS

(71) Applicant: NOKIA TECHNOLOGIES OY, Espoo (FI)

(72) Inventor: Liang Zhang, Beijing (CN)

(73) Assignee: Nokia Technology Oy, Espoo (FI)

( * ) Notice: Subject to any disclaimer, the term of this patent is extended or adjusted under 35 U.S.C. 154(b) by 331 days.

(21) Appl. No.: 14/655,285

(22) PCT Filed: Dec. 24, 2012

(86) PCT No.: PCT/CN2012/087328
§ 371 (c)(1),
(2) Date: Jun. 24, 2015

(87) PCT Pub. No.: WO2014/100949
PCT Pub. Date: Jul. 3, 2014

(65) Prior Publication Data
US 2015/0331548 A1    Nov. 19, 2015

(51) Int. Cl.
*G06F 3/041*    (2006.01)
*G06F 3/0481*    (2013.01)
*H04L 29/08*    (2006.01)
*G06F 3/0488*    (2013.01)
*G06F 3/0484*    (2013.01)

(52) U.S. Cl.
CPC ........ *G06F 3/0481* (2013.01); *G06F 3/04842* (2013.01); *G06F 3/04886* (2013.01); *H04L 67/10* (2013.01)

(58) Field of Classification Search
CPC .... G06F 3/0237; G06F 3/018; G06F 3/04886; G06F 3/04883; G06F 3/0482; G06F 17/2735; G06F 3/0481; H04L 67/10
See application file for complete search history.

(56) References Cited

U.S. PATENT DOCUMENTS 8,484,573 B1 *    7/2013    Zhai ................... G06F 3/04886
                                                                345/168
2005/0169527 A1 *    8/2005    Longe ................... G06F 3/0237
                                                                382/177

(Continued)

FOREIGN PATENT DOCUMENTS

CN    101334704 A    12/2008
CN    101424977 A    5/2009

OTHER PUBLICATIONS

Notification of Transmittal of The International Search Report and The Written Opinion of the International Searching Authority, or The Declaration; International Search Report; Written Opinion of the International Searching Authority, for corresponding International Application No. PCT/CN2012/087328, dated Oct. 3, 2013, 11 pages.

*Primary Examiner* — Tadesse Hailu
(74) *Attorney, Agent, or Firm* — Ditthavong & Steiner, P.C.

(57) ABSTRACT

Method and apparatus to enable selection of a user interface element based on the spatial interaction between a footprint assigned to a user input and the footprint assigned to a user interface element. The respective areas assigned to one or more of the respective footprints is based on at least one of the time period between the entered user input and the previous user input, and the distance between the entered user input and the previous user input.

20 Claims, 6 Drawing Sheets

(56) References Cited

U.S. PATENT DOCUMENTS

| | | | |
|---|---|---|---|
| 2006/0028450 A1* | 2/2006 | Suraqui | G06F 3/0237 345/169 |
| 2006/0265648 A1* | 11/2006 | Rainisto | G06F 3/0237 715/259 |
| 2007/0040813 A1* | 2/2007 | Kushler | G06F 3/0237 345/173 |
| 2007/0216658 A1* | 9/2007 | Rainisto | G06F 3/04886 345/173 |
| 2008/0229230 A1* | 9/2008 | Grigoriev | G06F 21/82 715/780 |
| 2008/0300853 A1* | 12/2008 | Xiaoning | G06F 3/023 704/2 |
| 2009/0273566 A1* | 11/2009 | Lu | G06F 3/0233 345/169 |
| 2010/0064030 A1* | 3/2010 | Miura | G06F 3/0237 709/219 |
| 2010/0225599 A1* | 9/2010 | Danielsson et al. | G06F 3/023 704/2 |
| 2011/0078613 A1* | 3/2011 | Bangalore | G06F 3/04886 715/773 |
| 2011/0154193 A1* | 6/2011 | Creutz | G06F 17/276 715/261 |
| 2011/0157046 A1* | 6/2011 | Lee | G04G 21/08 345/173 |
| 2011/0202876 A1* | 8/2011 | Badger | G06F 3/0237 715/816 |
| 2011/0252383 A1 | 10/2011 | Miyashita | |
| 2011/0317194 A1* | 12/2011 | Nakanishi | G06F 3/0237 345/173 |
| 2012/0068964 A1* | 3/2012 | Wright | G06F 3/0237 345/174 |
| 2012/0326984 A1* | 12/2012 | Ghassabian | G06F 3/0236 345/168 |
| 2013/0002553 A1* | 1/2013 | Colley | G06F 3/0236 345/161 |
| 2013/0125036 A1* | 5/2013 | Griffin | G06F 3/04886 715/773 |
| 2013/0268879 A1* | 10/2013 | Zhang | G06F 3/0418 715/773 |
| 2013/0283195 A1* | 10/2013 | Bilgen | G06F 3/04886 715/767 |
| 2014/0049477 A1* | 2/2014 | Dai | G06F 3/04886 345/173 |
| 2014/0104177 A1* | 4/2014 | Ouyang | G06F 3/04883 345/168 |
| 2016/0041965 A1* | 2/2016 | Ghassabian | G06F 3/005 715/261 |

* cited by examiner

Figure 7

781 — enable selection of a user interface element based
on the spatial interaction between a footprint
assigned to a user input and the footprint
assigned to a user interface element, wherein the
respective areas assigned to one or more of the
respective footprints is based on at least one of: the
time period between the entered user input and the previous
user input; and the distance between
the entered user input and the previous user input.

Figure 8

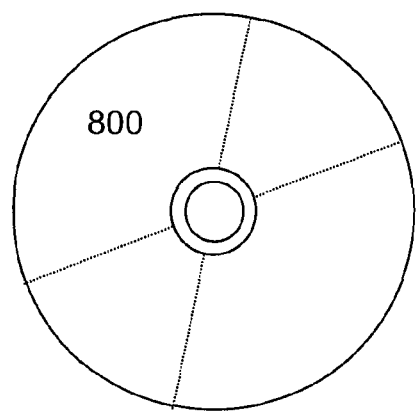

APPARATUS FOR A USER INTERFACE AND ASSOCIATED METHODS

RELATED APPLICATION

The present application is a national phase application of PCT Application No. PCT/CN2012/087328, filed Dec. 24, 2012, the contents of which are herein incorporated by reference.

TECHNICAL FIELD

The present disclosure relates to the field of user interfaces, associated methods and apparatus. Certain disclosed example aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs) and tablet PCs.

The portable electronic devices/apparatus according to one or more disclosed example aspects/embodiments may provide one or more audio/text/video communication functions (e.g. tele-communication, video-communication, and/or text transmission, Short Message Service (SMS)/Multimedia Message Service (MMS)/emailing functions, interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

It is common for electronic devices to provide a user interface (e.g. a graphical user interface). A user interface may enable a user to interact with an electronic device, for example, to open applications using application icons, enter commands, to select menu items from a menu, or to enter characters using a virtual keypad. To enter text strings, the user may be provided with a physical or virtual keyboard.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

According to a first example there is provided an apparatus comprising:
  at least one processor; and
  at least one memory including computer program code,
  the at least one memory and the computer program code configured, with the at least one processor, to cause the apparatus to perform at least the following:
  enable selection of a user interface element based on the spatial interaction between a footprint assigned to a user input and the footprint assigned to a user interface element, wherein the respective areas assigned to one or more of the respective footprints is based on at least one of:

the time period between the entered user input and the previous user input; and
  the distance between the entered user input and the previous user input.

Accordingly dynamic assignment of footprint areas is possible according to time/distance criteria mentioned above. The dynamic assignment may be to the user input, the user interface element, or both.

A user interface element footprint may be considered to spatially interact with a user input footprint when they come into contact (e.g. abut or have contiguous edges and/or surfaces) and/or when they overlap (e.g. lie or extend over and cover part of; or have an area, extent or range in common). In certain embodiments, at least one of the user input and the user interface element may be considered to have little or no area. For example, the user input may be a point which is considered to have no area (although, strictly speaking, it may have a very small area). Such a point user input would be considered to spatially interact with a user interface element having an area by being positioned within the area of the user interface element. The footprint may be considered to be the surface space/perimeter corresponding to the user input/user interface element. For example, a footprint may be characterised by its shape and/or area.

The previous user input may be the last or most recently provided user input (e.g. before the current entered user input).

The apparatus may be configured to assign a larger footprint to one or more of the respective user interface element and the user input when the time since the previous user input is within a predetermined (time) threshold than when the time since the previous user input exceeds the predetermined (time) threshold.

The apparatus may be configured to assign a smaller footprint to one or more of the respective user interface element and the user input when the distance from the previous user input does is within a predetermined (distance) threshold than when the time since the previous user input exceeds the predetermined (distance) threshold.

The apparatus may be configured to assign a larger footprint area to one or more of the respective user interface elements in response to determining a longer distance between the currently entered user input and the previous selected user input. The apparatus may be configured to assign a smaller footprint area to one or more of the respective user interface elements in response to determining a longer time period between the currently entered user input and the previous selected user input. The time/distance of the previous selected user input to the currently entered user input may be used as the predetermined threshold to allow for dynamic change/updating of the predetermined threshold for further user inputs.

The respective footprints may be assigned (e.g. by the apparatus or by another apparatus) according to a predefined relationship between the assigned area and at least one of the time period between the entered user input and the previous user input; and the distance between the entered user input and the previous user input.

The predefined relationship may one of linear and non-linear (e.g. with respect to the distance and/or the time). For example, the predefined relationship may be linear with respect to the distance between the entered user input and the previous user input, and non-linear with respect to the time period between the entered user input and the previous user input. The predefined relationship may or may not be monotonic.

The apparatus may be configured to assign respective footprints according to a predefined relationship in which larger footprint areas are assigned to one or more of the respective user interface element and the user input in response to determining a larger distance between the entered user input and the previous user input. That is, the predetermined relationship may be a monotonically increasing function of assigned area with respect to the distance (e.g. the predetermined function may be such that the assigned footprint area is proportional to the distance between the entered user input and the previous user input).

The apparatus may configured to assign respective footprints according to a predefined relationship in which smaller footprint areas are assigned to one or more of the respective user interface element and the user input in response to determining a longer time period between the entered user input and the previous user input. That is, the predetermined relationship may be a monotonically decreasing function of assigned area with respect to the time period (e.g. the predetermined function may be such that the assigned footprint area is inversely proportional to the time period between the entered user input and the previous user input).

The apparatus may be configured to enable the selection of the user interface element by assigning a smaller footprint to one or more of the respective user interface element and the user input when the time since the previous user input is associated with exceeding a predetermined (time) threshold.

The apparatus may be configured to enable the selection of the user interface element by assigning a larger footprint to one or more of the respective user interface element and the user input when the distance from the previous user input does is associated with exceeding a predetermined (distance) threshold.

The apparatus may be configured to determine that a user interface element has been selected when the respective areas assigned to one or more of the user interface element and the user input overlap according to one or more predetermined criteria. For example, the apparatus may be configured to select the user interface element footprint with the largest overlap area with the user input footprint.

The footprint area may be assigned to (for example, by the apparatus or another apparatus) at least one of the user interface element and the user input based on the type of user input. For example, the area assigned to a double tap user input may be different to the area assigned to a single tap user input.

The footprint area may be assigned to (for example, by the apparatus or another apparatus) at least one of the user interface element and the user input based on the respective user interface element. For example, a key user interface element may be assigned a different footprint area than that assigned to an icon.

The user input may be provided using a stylus (e.g. a user's finger) on a touch screen. The user input may be provided using a cursor controlled by an external user interface element (such as a mouse or touch pad). Accordingly, the apparatus may be configured to accept user input directly (e.g. if it comprises the touch screen) and/or indirectly from a stylus/cursor control by an external user interface element.

At least one user interface element may be one of an icon, a virtual key and a menu item.

At least one user interface element may form part of a virtual keyboard or virtual keypad. A keyboard or keypad for text entry may comprise, for example, an alphanumeric key input area, alphabetic key input area, a numeric key input area, an AZERTY key input area, a QWERTY key input area or an ITU-T E.161 key input area.

At least one user interface element may be configured to allow entry of a text string. A text string may comprise a series of one or more characters in a particular order. A character may comprise a combination of one or more of a word, a letter character (e.g. from the Roman, Greek, Arabic or Cyrillic alphabets), a graphic character (e.g. a sinograph, Japanese kana or Korean delineation), a phrase, a number, a syllable, a diacritical mark, an emoticon, and a punctuation mark. A text string may comprise a combination of one or more of: a word; a sentence; a phrase; an affix; a prefix and a suffix. A text string may include a series of letters/characters which can be used to transcribe, for example, Chinese (e.g. Pinyin, Zhuyin Fuhao). That is, the apparatus may be configured to enable input of Chinese or Japanese characters, either directly or via transcription methods such as Pinyin and/or Zhuyin Fuhao.

The apparatus may comprise a graphical user interface configured to provide the user interface elements as display outputs.

The apparatus may be a portable electronic device, a laptop computer, a mobile phone, a Smartphone, a tablet computer, a personal digital assistant, a digital camera, a watch, a server, a non-portable electronic device, a desktop computer, a monitor, a server, a wand, a pointing stick, a touchpad, a touch-screen, a mouse, a joystick or a module/circuitry for one or more of the same.

According to a further example there is provided a method, the method comprising:
 enabling selection of a user interface element based on the spatial interaction between a footprint assigned to a user input and the footprint assigned to a user interface element, wherein the respective areas assigned to one or more of the respective footprints is based on at least one of:
 the time period between the entered user input and the previous user input; and
 the distance between the entered user input and the previous user input.

According to a further example there is provided a computer program comprising computer program code, the computer program code being configured to perform at least the following:
 enable selection of a user interface element based on the spatial interaction between a footprint assigned to a user input and the footprint assigned to a user interface element, wherein the respective areas assigned to one or more of the respective footprints is based on at least one of:
 the time period between the entered user input and the previous user input; and
 the distance between the entered user input and the previous user input.

According to a further example there is provided an apparatus, the apparatus comprising:
 means for enabling configured to enable selection of a user interface element based on the spatial interaction between a footprint assigned to a user input and the footprint assigned to a user interface element, wherein the respective areas assigned to one or more of the respective footprints is based on at least one of:
 the time period between the entered user input and the previous user input; and
 the distance between the entered user input and the previous user input.

According to a further example there is provided an apparatus, the apparatus comprising:

an enabler configured to enable selection of a user interface element based on the spatial interaction between a footprint assigned to a user input and the footprint assigned to a user interface element, wherein the respective areas assigned to one or more of the respective footprints is based on at least one of:

the time period between the entered user input and the previous user input; and the distance between the entered user input and the previous user input.

The steps of any method disclosed herein do not have to be performed in the exact order disclosed, unless explicitly stated or understood by the skilled person.

Corresponding computer programs (which may or may not be recorded on a carrier, such as a CD or other non-transitory medium) for implementing one or more of the methods disclosed herein are also within the present disclosure and encompassed by one or more of the described example embodiments.

The present disclosure includes one or more corresponding aspects, embodiments or features in isolation or in various combinations whether or not specifically stated (including claimed) in that combination or in isolation. Corresponding means and corresponding function units (e.g. an enabler, a selector) for performing one or more of the discussed functions are also within the present disclosure.

The above summary is intended to be merely exemplary and non-limiting.

BRIEF DESCRIPTION OF THE FIGURES

A description is now given, by way of example only, with reference to the accompanying drawings, in which:—

FIG. 7 shows the main steps of a method of enabling selection of a user interface element; and FIG. 8 illustrates an example of a computer-readable medium comprising a computer program.

DESCRIPTION OF SPECIFIC ASPECTS/EMBODIMENTS

Figure 1:
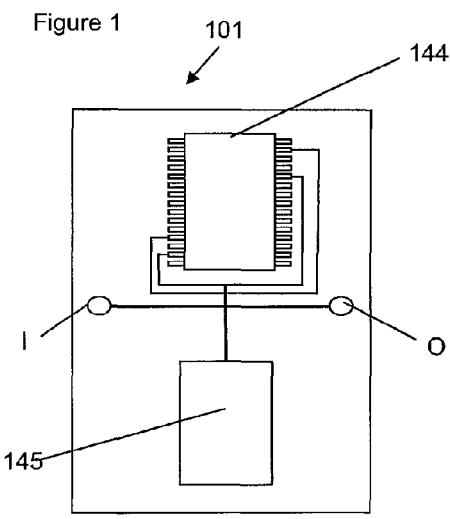
FIG. 1 depicts an example apparatus embodiment according to the present disclosure comprising a number of electronic components, including memory and a processor.

It is common for an electronic device to have a user interface (which may or may not be graphically based) to allow a user to interact with the device to enter and/or interact with information. For example, the user may use a keyboard user interface to enter text, or user icons to open applications.

For small devices in particular, there are competing factors in providing as many user interface elements as possible (e.g. to increase the functionality available to the user), and ensuring that the overall size of the user interface element array does not take up too much space.

Taking character entry as an example, these competing factors of number and size of user interface elements may be accommodated in a number of different ways. For example, some devices provide a large number of small user interface elements (e.g. small keys) and rely on, for example, spell checking to correct mistakes if the user does not select the intended sequence of user interface elements. This solution may lead to unwanted corrections and/or errors when the intended word is not in the spell checking dictionary.

Another solution is to provide a smaller number of user interface elements with each user interface element corresponding to more than one character. Such keyboards may be ambiguous or unambiguous. An ambiguous keyboard is one where each user interface element is associated with a plurality of characters such that when a user selects a sequence of user interface elements, the device uses, for example, predictive text techniques to disambiguate the ambiguous character sequence. Ambiguous keyboards may generate the wrong word if more than one word is associated with the same ambiguous key sequence. An unambiguous keyboard is one where the user presses the key in such a way as to unambiguously indicate to the device which of the characters he intends to use (e.g. multi-tap, where the user presses the 'abc2' key once for "a", twice for "b", three times for "c", and so on). Unambiguous keyboards with multiple characters per key may require significant extra effort to enter a character sequence.

Other keyboards use magnification techniques wherein a portion of the keyboard is enlarged as the user brings his finger towards that area. However, as the relative positions of the keys shift as a portion is magnified, it may be difficult for a user to position his finger accurately.

Examples set out in the present disclosure may relate to enabling selection of a user interface element (such as a virtual key) based on the spatial interaction between a footprint assigned to a user input and the footprint assigned to a user interface element, wherein the respective areas assigned to one or more of the respective footprints is based on at least one of: the time period between the entered user input and the previous user input; and the distance between the entered user input and the previous user input. This may result in few errors being made when selecting user interface elements in succession.

Other example embodiments depicted in the figures have been provided with reference numerals that correspond to similar features of earlier described example embodiments. For example, feature number 1 can also correspond to numbers 101, 201, 301 etc. These numbered features may appear in the figures but may not have been directly referred to within the description of these particular example embodiments. These have still been provided in the figures to aid understanding of the further example embodiments, particularly in relation to the features of similar earlier described example embodiments.

FIG. 1 shows an apparatus 101 comprising memory 145, a processor 144, input I and output O. In this example embodiment only one processor and one memory are shown but it will be appreciated that other example embodiments may utilise more than one processor and/or more than one memory (e.g. same or different processor/memory types).

In this example embodiment the apparatus 101 is an Application Specific Integrated Circuit (ASIC) for a portable electronic device. In other example embodiments the apparatus 101 can be a module for such a device, or may be the device itself, wherein the processor 144 is a general purpose CPU of the device and the memory 145 is general purpose memory comprised by the device.

The input I allows for receipt of signalling to the apparatus 101 from further components (e.g. from a receiver), such as components of a portable electronic device (like a touch-sensitive display) or the like. The output O allows for onward provision of signalling from within the apparatus 101 to further components. In this example embodiment the input I and output O are part of a connection bus that allows for connection of the apparatus 101 to further components (e.g. to a transmitter or a display).

The processor 144 may be a general purpose processor dedicated to executing/processing information received via the input I in accordance with instructions stored in the form of computer program code on the memory 145. The output signalling generated by such operations from the processor 144 is provided onwards to further components via the output O.

The memory 145 (not necessarily a single memory unit) is a computer readable medium (solid state memory in this example, but may be other types of memory such as a hard drive, ROM, RAM, Flash or the like) that stores computer program code. This computer program code stores instructions that are executable by the processor 144, when the program code is run on the processor 144. The internal connections between the memory 145 and the processor 144 can be understood to provide, in one or more example embodiments, an active coupling between the processor 144 and the memory 145 to allow the processor 144 to access the computer program code stored on the memory 145.

In this example the input I, output O, processor 144 and memory 145 are all electrically connected to one another internally to allow for electrical communication between the respective components I, O, 144, 145. In this example the components are all located proximate to one another so as to be formed together as an ASIC, in other words, so as to be integrated together as a single chip/circuit that can be installed into an electronic device. In other examples one or more or all of the components may be located separately from one another.

Figure 2:
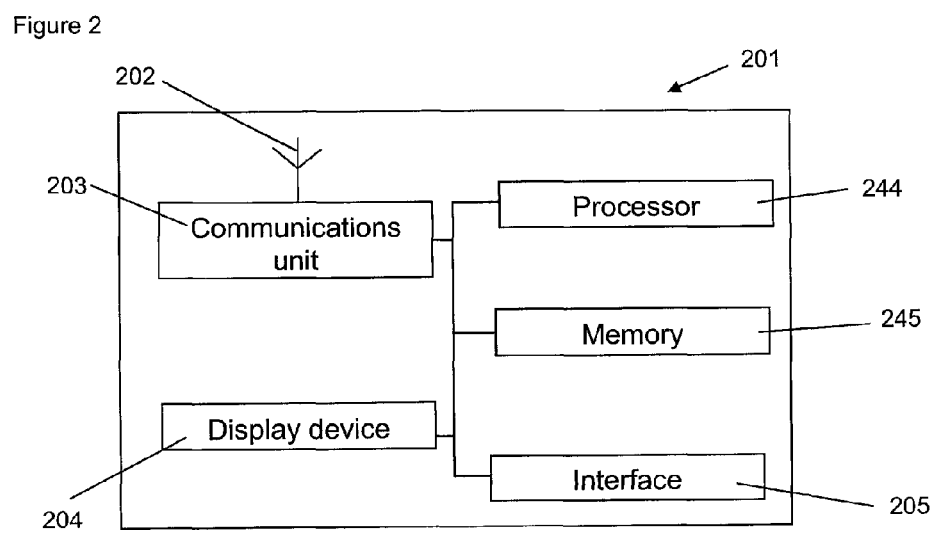
FIG. 2 depicts an example apparatus embodiment according to the present disclosure comprising a number of electronic components, including memory, a processor and a communication unit.

FIG. 2 depicts an apparatus 201 of a further example embodiment, such as a mobile phone. In other example embodiments, the apparatus 201 may comprise a module for a mobile phone (or PDA or audio/video player), and may just comprise a suitably configured memory 245 and processor 244. The apparatus in certain example embodiments could be a portable electronic device, a laptop computer, a mobile phone, a Smartphone, a tablet computer, a personal digital assistant, a digital camera, a watch, a server, a non-portable electronic device, a desktop computer, a monitor, a server, a wand, a pointing stick, a touchpad, a touchscreen, a mouse, a joystick or a module/circuitry for one or more of the same.

The example embodiment of FIG. 2, in this case, comprises a display device 204 such as, for example, a Liquid Crystal Display (LCD) or touch-screen user interface. The apparatus 201 of FIG. 2 is configured such that it may receive, include, and/or otherwise access data. For example, this example embodiment 201 comprises a communications unit 203, such as a receiver, transmitter, and/or transceiver, in communication with an antenna 202 for connecting to a wireless network and/or a port (not shown) for accepting a physical connection to a network, such that data may be received via one or more types of networks. This example embodiment comprises a memory 245 that stores data, possibly after being received via antenna 202 or port or after being generated at the user interface 205. The processor 244 may receive data from the user interface 205, from the memory 245, or from the communication unit 203.

It will be appreciated that, in certain example embodiments, the display device 204 may incorporate the user interface 205. Regardless of the origin of the data, these data may be outputted to a user of apparatus 201 via the display device 204, and/or any other output devices provided with apparatus. The processor 244 may also store the data for later use in the memory 245. The memory 245 may store computer program code and/or applications which may be used to instruct/enable the processor 244 to perform functions (e.g. read, write, delete, edit or process data).

Figure 3:
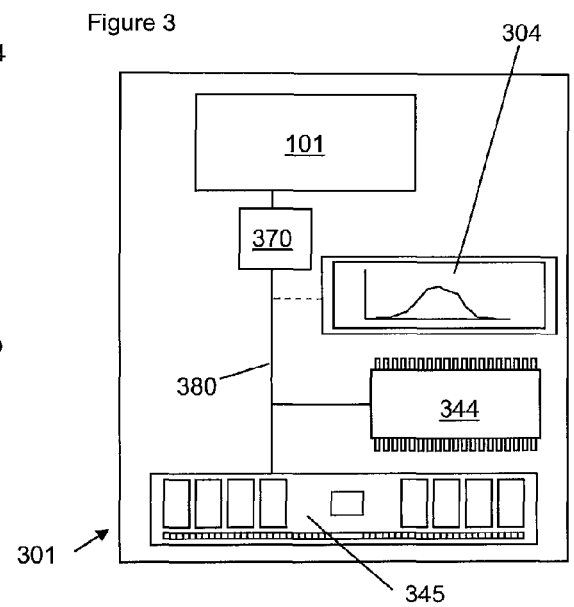
FIG. 3 depicts an example apparatus embodiment according to the present disclosure comprising a number of electronic components, including memory, a processor and a communication unit.

FIG. 3 depicts a further example embodiment of an electronic device 301, such as a tablet personal computer, a portable electronic device, a portable telecommunications device, a server or a module for such a device, the device comprising the apparatus 101 of FIG. 1. The apparatus 101 can be provided as a module for device 301, or even as a processor/memory for the device 301 or a processor/memory for a module for such a device 301. The device 301 comprises a processor 344 and a storage medium 345, which are connected (e.g. electrically and/or wirelessly) by a data bus 380. This data bus 380 can provide an active coupling between the processor 344 and the storage medium 345 to allow the processor 344 to access the computer program code. It will be appreciated that the components (e.g. memory, processor) of the device/apparatus may be linked via cloud computing architecture. For example, the storage device may be a remote server accessed via the internet by the processor.

The apparatus 101 in FIG. 3 is connected (e.g. electrically and/or wirelessly) to an input/output interface 370 that receives the output from the apparatus 101 and transmits this to the device 301 via data bus 380. Interface 370 can be connected via the data bus 380 to a display 304 (touchsensitive or otherwise) that provides information from the apparatus 101 to a user. Display 304 can be part of the device 301 or can be separate. The device 301 also comprises a processor 344 configured for general control of the apparatus 101 as well as the device 301 by providing signalling to, and receiving signalling from, other device components to manage their operation.

The storage medium 345 is configured to store computer code configured to perform, control or enable the operation of the apparatus 101. The storage medium 345 may be configured to store settings for the other device components. The processor 344 may access the storage medium 345 to retrieve the component settings in order to manage the operation of the other device components. The storage medium 345 may be a temporary storage medium such as a volatile random access memory. The storage medium 345 may also be a permanent storage medium such as a hard disk drive, a flash memory, a remote server (such as cloud storage) or a non-volatile random access memory. The storage medium 345 could be composed of different combinations of the same or different memory types.

FIG. 4*a*-*e* shows an example embodiment of a mobile phone portable electronic device 401 comprising a touch screen 404, 505. In this case, the electronic device is configured to enable selection of a user interface element based on the spatial interaction between a footprint assigned to a user input and the footprint assigned to a user interface element, wherein the respective areas assigned to one or more of the respective footprints is based on at least one of:

the time period between the entered user input and the previous user input; and the distance between the entered user input and the previous user input.

In this example embodiment, the area assigned to the user input is based on Fitt's law. Fitt's law is a relationship between time period between the entered user input and the previous user input, T; the distance between the entered user input and the previous user input, D; and the area of the footprint, A, given by the following formula, in which a and b are constants:

$$T=a+b\ \log_2(1+D/A)$$

That is, in this case, the area assigned to user input footprint is based on: the time period between the entered user input and the previous user input, T; and the distance between the entered user input and the previous user input, D.

It will be appreciated that other example embodiments may use different predetermined relationships/functions to assign footprint areas to user interface elements and/or user inputs. For example other example embodiments may use the relationship T=D/A.

Other example embodiments may have different and potentially more complex relationships. For example, other example embodiments may assign footprint areas based on whether the time or distance since the previous user input is within or exceeds a predetermined threshold. For example, an example embodiment may be configured to assign a footprint area of 1 cm$^2$ to a user input if the time period between the entered user input and the previous user input is less than or equal to 500 ms and to assign a footprint area of 0.5 cm$^2$ to a user input if the time period between the entered user input and the previous user input is greater than 500 ms. In this way the apparatus would be configured to enable selection based on an assigned larger footprint to one or more of the respective user interface element and the user input when the time since the previous user input is within a predetermined threshold; and to enable the selection of the user interface element by assigning a smaller footprint to one or more of the respective user interface element and the user input when the time since the previous user input is associated with exceeding a predetermined threshold. In certain example embodiments, of course, the apparatus itself may provide for the dynamic assignment of footprint areas as well as the example embodiment of selection according to the assignment.

It will be appreciated that corresponding thresholds may be used for distances. That is, the apparatus is configured to enable selection based on an assignment a smaller footprint to one or more of the respective user interface element and the user input when the distance from the previous user input is within a predetermined threshold and/or to enable the selection of the user interface element by assigning a larger footprint to one or more of the respective user interface element and the user input when the distance from the previous user input does is associated with exceeding a predetermined threshold. Again, in certain example embodiments, the apparatus itself may provide for the dynamic assignment as well as the enablement of selection according to the dynamic assignment.

The area assigned to the user input may be considered to be a tolerance area around a touch point (e.g. one pixel position which is the centre of the touch input). If this area overlaps with the footprint of a user interface element, then that user interface element is considered to be a candidate user interface element (i.e. it may be considered to be the user interface element which the user wished to select).

Figure 4A:
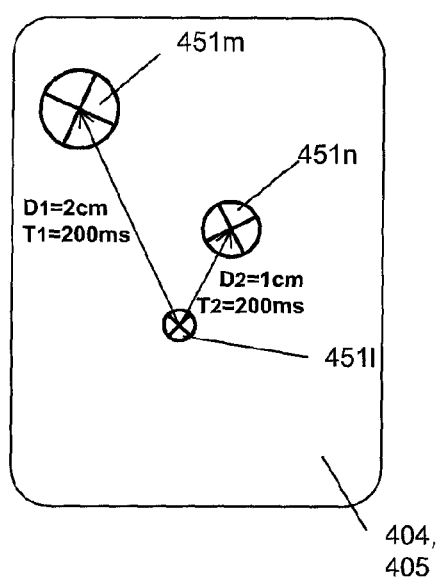
FIGS. 4a-e show an example embodiment configured to enable text entry.
Figure 4B:
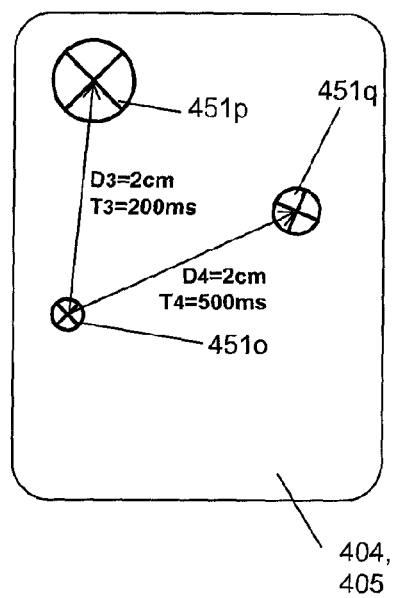

FIGS. 4a and 4b show the areas assigned to the user inputs 451m, 451n, 451p, 4551q provided to the touch screen 404, 405 in four different situations. Each user input 451l-451q is represented by a circle, which encompasses the area assigned to the user input; and crosshairs, which show the position of the centre of the detected input. The detected input is the area of input detected by the user interface/apparatus which may be distinct from the input assigned to the input by the apparatus/device. For example, the user interface may detect an input which has an area of 1 cm$^2$ (e.g. based on the area of the user's thumb touching the screen) but assign an area of 1.5 cm$^2$ (e.g. based on the distance and time since the previous input).

FIG. 4a shows two possible user inputs 451m, 451n which the user could make after the same previous user input 451l. In particular, in FIG. 4b, the time period between the possible entered user inputs 451m, 451n and the previous user input 451l, T, is the same ($T_1=T_2=200$ ms); but the distances between the possible entered user inputs 451m, 451n and the previous user input 451l, D are different ($D_1=2$ cm; $D_2=1$ cm). For this example embodiment, as the area assigned to the input footprint area is governed by Fitt's law, the apparatus/device is configured to dynamically assign a larger user input footprint area ($A_1>A_2$) when the distance between an entered user input and the previous user input is larger ($D_1>D_2$). That is, the apparatus device is configured to assign a larger footprint area to a user input in response to determining a longer distance between the entered user input and the previous user input. This assessment of larger/smaller distance may be done by comparison with respect to a predetermined (distance) threshold (e.g. 1.5 cm in this case) or by using a predetermined function/relationship to calculate the footprint area. In the threshold case, the predetermined threshold could be the distance travelled between the previous input 451l, and the last selection before the previous input (not shown). In this way the predetermined threshold could be updated as further inputs occur.

FIG. 4b also shows two possible user inputs 451p, 451q which the user could make after the same previous user input 451o. In these examples, the time periods between the possible entered user inputs 451p-451q and the previous user input 451o, T, are different ($T_3=200$ ms; $T_4=500$ ms); but the distance between the possible entered user inputs 451p, 451q and the previous user input 451o, D is the same ($D_3=D_4=2$ cm). For this example embodiment, as the area assigned to the input footprint area is governed by Fitt's law, the apparatus/device is configured to assign a larger user input footprint area ($A_3>A_4$) when the time between the entered user input and the previous user input is smaller ($T_3<T_4$). That is, the apparatus device is configured to assign a smaller footprint area to one or more of the respective user interface elements in response to determining a longer time period between the entered user input and the previous user input. Again, this assessment of larger/smaller time may be done by comparison with respect to a predetermined (time) threshold (e.g. 300 ms in this case) or by using a predetermined function to calculate the footprint area. In the threshold case, the predetermined threshold could be the time period between the previous input 4510 and the last selection before the previous input (not shown). In this way, the predetermined threshold could be updated as further inputs occur.

Figure 4C:
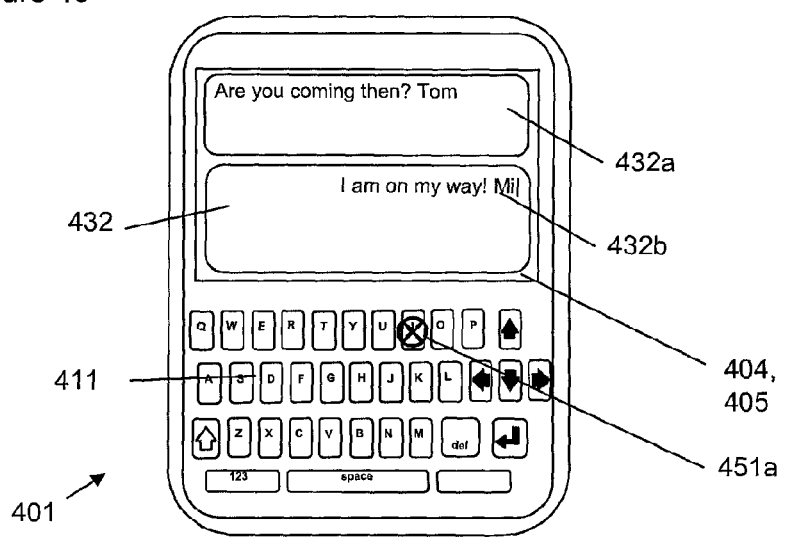

As a specific example, FIG. 4c shows the device/apparatus 401 as the user is using the device to enter a text message and send it to his friend. FIG. 4c shows the device as the user is in the process of entering his name, which is 'Mike'.

When the user is entering a text message, the device is configured to display a virtual keypad 411 and a message region 432, the message region 432 being configured to show received messages 432*a*, previously sent messages and messages being composed 432*b*. In this case, the user enters text by selecting user interface element keys corresponding to characters from the virtual keypad 411.

The selection is based on the spatial interaction between a footprint assigned to a user input and the footprint assigned to a user interface element. In this case, the footprint assigned to the user interface elements corresponds to the area indicated by the key boundary. In this example embodiment, the user interface element footprint area does not change with time or distance from a previous user input. FIG. 4*a* shows the footprint 451*a* assigned to a user input provided by the user as he enters characters using the virtual keypad 411. The user input footprint area is the area within the circle shown in FIG. 4*c* and the centre of the user input corresponds with the position of the crosshairs of the area. In this case, because the footprint area assigned to the user input only spatially interacts (in this case by overlapping) with the 'i' key user interface element, the 'i' character is selected for this user input 451*a*.

Figure 4D:
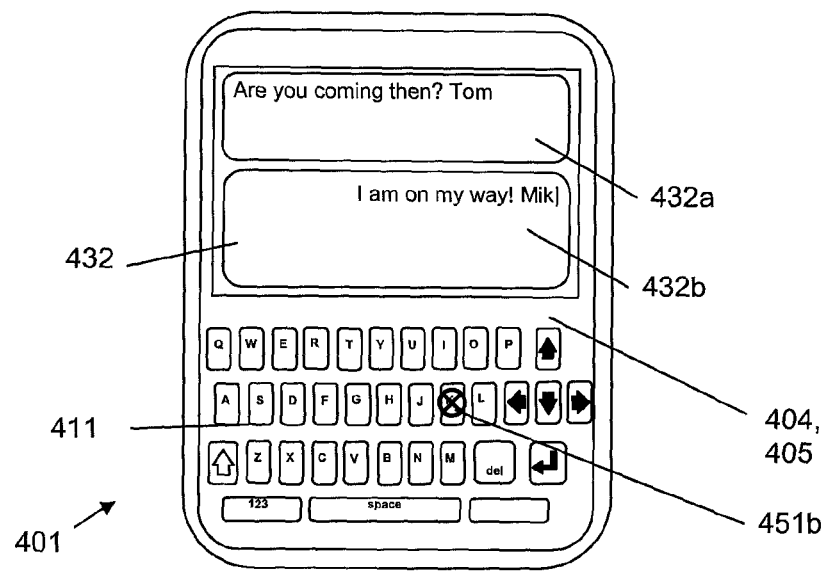

FIG. 4*d* shows the device 401 when the user has entered a subsequent user input 451*b* after the user input shown in FIG. 4*c*. In this case, the user input 451*a* shown in FIG. 4*d* was entered a relatively long time and a relatively short distance from the previous input (shown in FIG. 4*c*). Therefore, in this situation, the apparatus/device is configured to assign a relatively small footprint area to the user input.

In this case, the area of the user input spatially interacts with only a single user interface element: the user interface element corresponding to the letter 'k'. Therefore, the apparatus/device is configured to enter the selected character into the message which is being composed. This is shown in FIG. 4*d*.

Figure 4E:
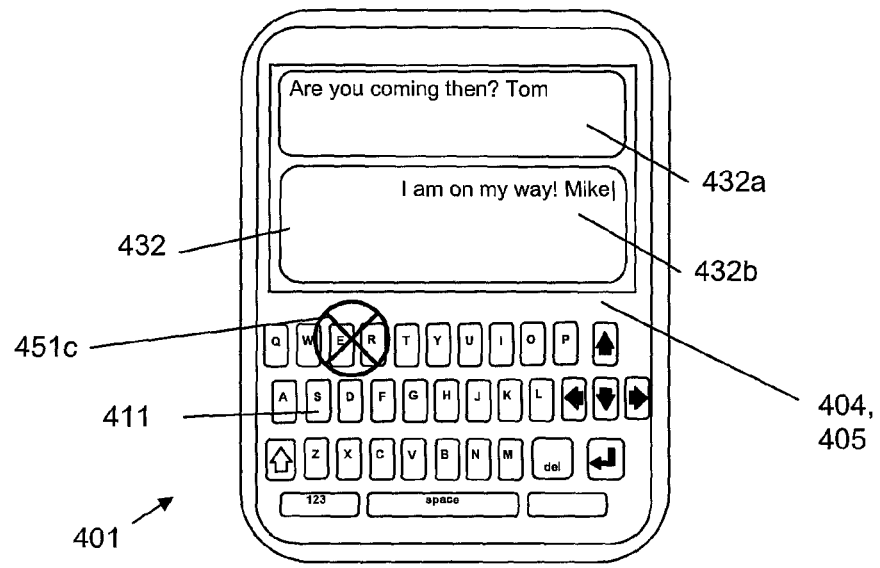

FIG. 4*e* shows the device when the user has entered a subsequent user input 451*c* after the user input 451*b* shown in FIG. 4*d*. In this case, the user input 451*c* shown in FIG. 4*e* was entered a relatively short time and a long distance from the previous input 451*b* (shown in FIG. 4*d*). Therefore, in this situation, based on the distance and time since the previous user input 451*b*, the apparatus/device is configured to assign a relatively large footprint area to the user input 451*c*. (Relative in this case means relative with respect to the corresponding parameters associated with the input shown in FIG. 4*c*). For other example embodiments, relative could refer to the magnitude with respect to a predetermined threshold (the predetermined threshold may be constant or be dynamically updated).

In this case, the assigned footprint of the user input 451*c* spatially interacts with three user interface element footprints: the user interface elements corresponding to the letter 'w'; the letter 'e'; and the letter 'r'. In this case, the apparatus is configured to disambiguate the ambiguous user input 451*c* (i.e. the user input is ambiguous because it corresponds to multiple possible user interface element candidates).

In this case, the disambiguation is based on the area of the overlap spatial interaction and on predictive text techniques. In the situation depicted in FIG. 4*d*, the 'w' user interface element is not selected because the area of the overlap spatial interaction is much smaller than that of the area of the overlap spatial interaction for either the 'e' user interface element or for the 'r' user interface element.

As the area of the overlap spatial interaction between the user input footprint and the 'e' and 'r' footprints are similar, the apparatus/device uses predictive text techniques to determine which user interface element is to be selected. In this case, there are no words in the predictive text dictionary comprising the character string 'Mikr' whereas there are one or more words in the predictive text dictionary comprising the character string 'Mike'. Therefore based on this, the apparatus/device is configured to select the user interface element corresponding to the character 'e'. The apparatus/device is configured to enter the selected character into the message which is being composed. This is shown in FIG. 4*e*.

It will be appreciated that other example embodiments may be configured to distinguish between spatial interactions between the footprint of the user input and the footprints of different user interface elements in different ways. For example, example embodiments may be configured to assign a probability based on one or more of: the proximity of the centre of the user input and the centre of the user interface element; the area of overlap; the duration of input; the detected area of the user input (e.g. the size of the stylus which is in contact with, or within the detection region of, a touch screen such as the size of a user's finger); the shape of the detected area of the user input and the footprint area assigned to the previous user input.

Alternatively/in addition, the apparatus/device may be configured to select a user interface element from multiple possible user interface elements based on how easy it is to recover the situation if the user interface element is inadvertently selected. For example, when a user was providing input to a messaging application, if the user input footprint spatially interacted with both a 'cancel' user interface element configured to delete an entered message; and a 'add recipient' user interface element, the apparatus/device may be configured to select the 'add recipient' user interface element in preference to the 'cancel' user interface element. This is because to recover from inadvertently selecting the 'add recipient' user interface element, the user could simply delete the new recipient or press 'back', whereas if the user inadvertently selected the 'cancel' user interface element they may have to enter the message again. Alternatively/in addition, the apparatus/device may be configured to prompt the user to confirm selection in situations where the desired user interface element cannot be determined.

It will be appreciated that, in certain example embodiments, the same apparatus/device may be configured to dynamically assign a footprint area to at least one of a user interface element and a user input when the user initiates the user input (e.g. when the user's finger or other stylus first comes within the detection range of a touch screen), and to enable selection of a user interface element when the user completes the user input (e.g. when the user lifts his finger or other stylus from the touch screen).

In this example embodiment, the user interface comprises a touch screen. It will be appreciated that other example embodiments may comprise a graphical user interface with which the user can interact using a cursor controlled by a separate user interface element, for example, a mouse or touch pad (which may or may not be part of the same device as the graphical user interface).

FIG. 5*a*-5*e* shows an example embodiment of a Personal Digital Assistant (PDA) portable electronic device 501 comprising a touch screen display 504, 505.

Figure 5A:
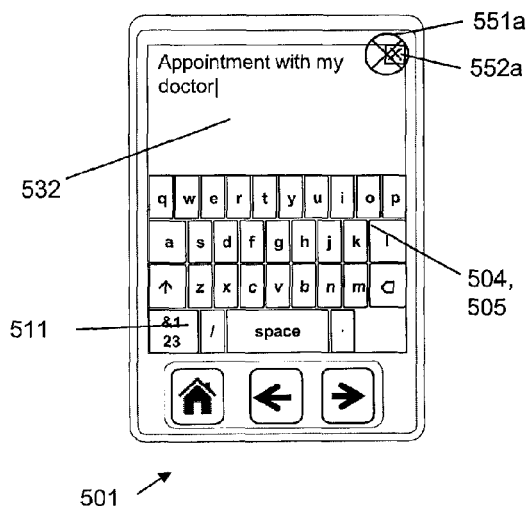
FIGS. 5a-e depict a further example embodiment configured to enable selection of icons.

In this case, the user is using the device to enter a calendar entry. FIG. 5*a* shows the device when the user has finished entering the calendar entry details. When the user is entering a calendar entry, the device is configured to display a virtual keypad 511 and a text field 532, the text field 532 being configured to show the calendar entry as it is being composed.

Like the previous example embodiments, the selection is based on the spatial interaction between a footprint assigned to a user input and the footprint assigned to a user interface element. Unlike the previous example embodiment, for this example embodiment, the footprint assigned to the user input does not change based on the time or distance from a previous user input. However, in this case, the footprints assigned to the user interface elements are configured to change based on the time from the previous user input.

Figure 5B:
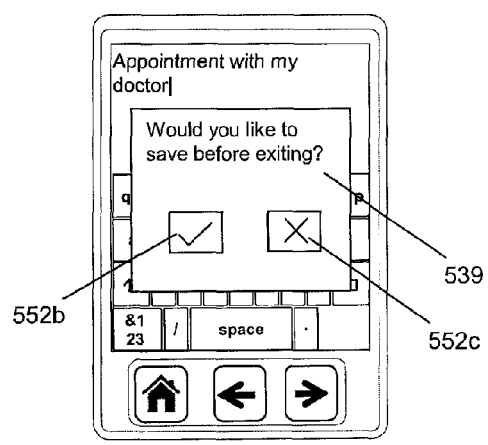

FIG. 5a shows the user interface after the user has completed entering his calendar entry. The user has then selected a 'close calendar entry' user interface element 552a located at the top of right of the display by providing an input 551a which spatially interacts with the close window user interface element (i.e. the user interface element 552a and the user input 551a overlap). In response to selection of the close window user interface element, the apparatus/device 501 is configured to present a pop-up window 539 prompting the user to either save the calendar entry before exiting or to exit without saving. Each of the options is available through selection of the respective user interface element 552b, 552c. The view, as seen by the user, is shown in FIG. 5b.

As noted above, the footprint area dynamically assigned to the 'save' user interface element and 'don't save' user interface element is based on the time between the user input and the previous user input. In this case, because selecting the 'don't save' user interface element may result in an irretrievable loss of data, whereas selecting the 'save' user interface element may not, the areas assigned to the different user interface elements are different. In addition, unlike the previous example embodiment, this example embodiment is configured to assign different footprint areas based on the type of user input (e.g. whether the user input is a single or double tap input).

Figure 5C:
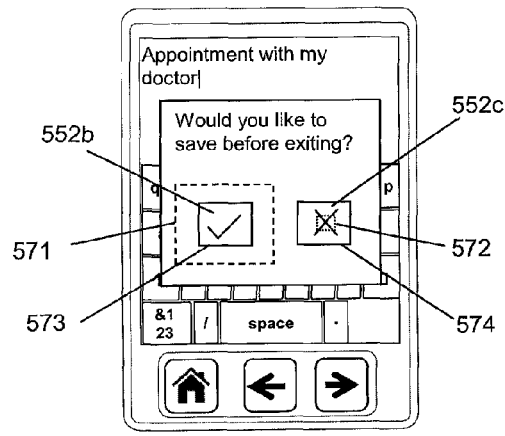

FIG. 5c shows the situation a short time (e.g. 100 ms) after the previous user input (as shown in FIG. 5a). The footprints 571, 572 assigned to the 'save' and 'don't save' user interface elements for single tap inputs are shown as dotted lines in FIG. 5c (but would not be visible to the user in this example embodiment, but in other example embodiments, the actual size of the user interface element may change accordingly). As shown in FIG. 5c, the area assigned to the 'save' user interface element 571 for single tap input is larger than the representation of the user interface element 552b displayed to the user. This makes it easier for the user to select this user interface element 571 because the user does not have to accurately provide input within the boundary of the displayed user interface element 552b.

In contrast, the area assigned to the 'don't save' user interface element 572 for single tap input is smaller than the representation of the user interface element 552c displayed to the user. This makes it more difficult for the user to select this user interface element 572 because the user must accurately provide input at the centre of the displayed user interface element 552c to select the user interface element. In this way, for single tap user input, the relative difficulty of selecting user interface elements can be adjusted by assigning different footprint areas to the respective user interface elements.

In order to allow the user to select either user interface element quickly, the apparatus/device is configured to assign a different area to each of the user interface elements when the user input is a double tap user input. Initially (as shown in FIG. 5c), the area associated with the 'save' and 'don't save' user interface elements 573, 574 correspond with the areas of the displayed user interface element representations 552b, 552c. In this way, if the user is sure that they wish to exit without saving, they can enter a double tap user input within the displayed 'don't save' user interface element which will enable selection of the 'don't save' user interface element.

Figure 5D:
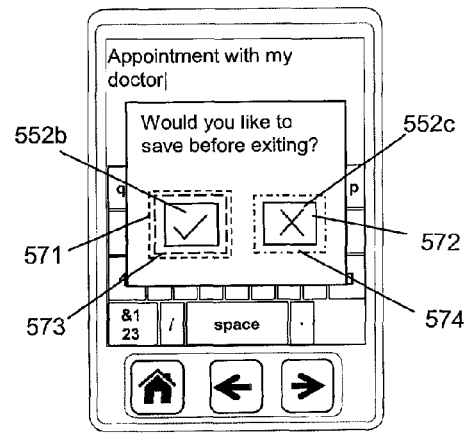

For both the 'save' and 'don't save' user interface elements 552b, 552c the areas assigned to the user interface element footprints 573, 574 are configured to be larger for larger times between the double tap user input and the previous user input. This allows the user to be less accurate in selecting user interface elements as time elapsed (e.g. as he may have had more time to consider his selection). As shown in FIG. 5d, at a later time after the previous user input (e.g. 2 second), the footprint area 571 of the 'save' user interface element for single tap input has shrunk; whereas the area of the 'save' user interface element 573 for double tap input has been enlarged. For the 'don't save' user interface element, the footprint 572 for single tap input has been enlarged to be the same size as the user interface element 552b; and footprint 574 for double tap input has been enlarged to be bigger than the user interface element 552b.

Figure 5E:
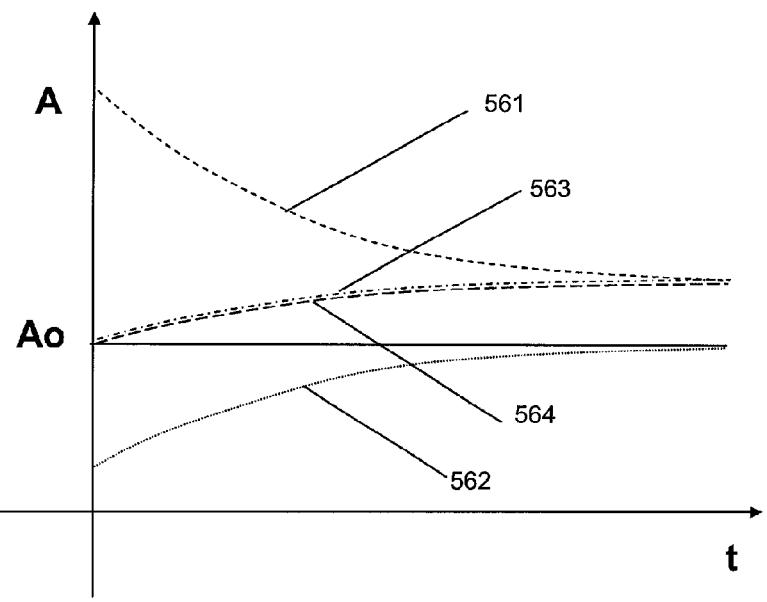

FIG. 5e shows the a schematic graph of how the footprint area, A, assigned to the 'save' user interface elements for single tap input 561; the area assigned to the 'don't save' user interface elements for single tap input 562; the area assigned to the 'save' user interface elements for double tap input 563; and the area assigned to the 'don't save' user interface elements for double tap input 564 changes with time, t. Ao is the area of each of the displayed 'save' and 'don't save' user interface elements 552b, 552c (or in the case the displayed area is varied, Ao can be the normally displayed area for a medium speed/distance input).

That is, for double tap input to both 'save' and 'don't save' user interface elements 552b, 552c and for single tap input to the 'don't save' user interface element 552c, the apparatus/device is configured to assign respective footprints according to a predefined relationship in which larger footprint areas are assigned to the respective user interface element in response to determining a longer time period between the entered user input and the previous user input. In this case the predetermined relationship is a monotonically increasing non-linear function of assigned area with respect to the time period.

For single tap input to the 'save' user interface element 552b, the apparatus/device is configured to assign the user input element footprint according to a predefined relationship in which smaller footprint areas are assigned to the user interface element in response to determining a longer time period between the entered user input and the previous user input. In this case the predetermined relationship is a monotonically decreasing non-linear function of assigned area with respect to the time period.

It will be appreciated that in other example embodiments, the areas assigned to neighbouring (e.g. adjacent or nearby) user interface elements may overlap. For these example embodiments, if the user input spatially interacts with multiple user interface elements (e.g. if the user input is provided within an overlap region), the apparatus may be configured to determine which user interface elements is selected based on, for example, one or more of: the duration of user input; the detected area of the user input; predictive text determinations; and context determinations; and the shape of the detected user input.

Figure 6A:
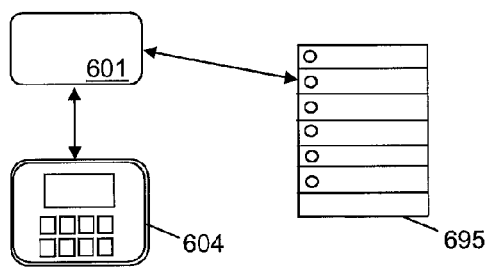
FIGS. 6a-6b illustrate an example apparatus according to the present disclosure in communication with a remote server/cloud.
Figure 6B:
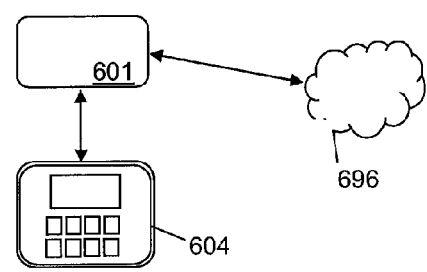

FIG. 6a shows that an example embodiment of an apparatus in communication with a remote server. FIG. 6b shows that an example embodiment of an apparatus in communication with a "cloud" for cloud computing. In FIGS. 6a and 6b, apparatus 601 (which may be apparatus 101, 201 or 301 is in communication with a display 604). Of course, the apparatus 601 and display 604 may form part of the same apparatus/device, although they may be separate as shown in the figures. The apparatus 601 is also in communication with a remote computing element. Such communication may be via a communications unit, for example. FIG. 6a shows the remote computing element to be a remote server 695, with which the apparatus may be in wired or wireless communication (e.g. via the internet, Bluetooth, a USB connection, or any other suitable connection as known to one skilled in the art).

In FIG. 6b, the apparatus 601 is in communication with a remote cloud 696 (which may, for example, by the Internet, or a system of remote computers configured for cloud computing). It may be that the functions associated with the user interface elements are stored at the remote computing element 695, 696) and accessed by the apparatus 601 for display 604. The enabling selection of a user interface element may be performed at the remote computing element 695, 696. The apparatus 601 may actually form part of the remote sever 695 or remote cloud 696.

FIG. 7 illustrates the process flow according to an example embodiment of the present disclosure. The process comprises enabling 781 selection of a user interface element based on the spatial interaction between a footprint assigned to a user input and the footprint assigned to a user interface element, wherein the respective areas assigned to one or more of the respective footprints is based on at least one of: the time period between the entered user input and the previous user input; and the distance between the entered user input and the previous user input.

FIG. 8 illustrates schematically a computer/processor readable medium 800 providing a computer program according to one embodiment. In this example, the computer/processor readable medium 800 is a disc such as a digital versatile disc (DVD) or a compact disc (CD). In other embodiments, the computer/processor readable medium 800 may be any medium that has been programmed in such a way as to carry out an inventive function. The computer/processor readable medium 800 may be a removable memory device such as a memory stick or memory card (SD, mini SD or micro SD).

The computer program may comprise computer code configured to perform, control or enable one or more of the method steps 781 of FIG. 7. In this respect, the computer program may be stored on the storage medium of the scanning/initiating device, the storage medium of the advertising device or the storage media of both devices.

It will be appreciated to the skilled reader that any mentioned apparatus/device and/or other features of particular mentioned apparatus/device may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some example embodiments, a particular mentioned apparatus/device may be pre-programmed with the appropriate software to carry out desired operations, and wherein the appropriate software can be enabled for use by a user downloading a "key", for example, to unlock/enable the software and its associated functionality. Advantages associated with such example embodiments can include a reduced requirement to download data when further functionality is required for a device, and this can be useful in examples where a device is perceived to have sufficient capacity to store such pre-programmed software for functionality that may not be enabled by a user.

It will be appreciated that any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/position of a circuit board or even the same device. In some example embodiments one or more of any mentioned processors may be distributed over a plurality of devices. The same or different processor/processing elements may perform one or more functions described herein.

It will be appreciated that the term "signalling" may refer to one or more signals transmitted as a series of transmitted and/or received signals. The series of signals may comprise one, two, three, four or even more individual signal components or distinct signals to make up said signalling. Some or all of these individual signals may be transmitted/received simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features as applied to different embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. An apparatus comprising:
   at least one processor; and
   at least one memory including computer program code, the at least one memory and the computer program code configured, with the at least one processor, to cause the apparatus to perform at least the following:
     enable selection of a user interface element based on the spatial interaction between a footprint area assigned to a user input and a footprint area assigned to a user interface element, wherein one of a larger footprint area and a smaller footprint area is assigned to one or more footprints assigned to a user input and to a user interface element based on at least one of:
     the time period between the entered user input and the previous user input; and
     the distance between the entered user input and the previous user input.

2. The apparatus of claim 1, wherein the apparatus is configured to assign the larger footprint area to one or more of the respective user interface element and the user input when the time since the previous user input is within a predetermined threshold than when the time since the previous user input exceeds the predetermined threshold.

3. The apparatus of claim 1, wherein the apparatus is configured to assign the smaller footprint area to one or more of the respective user interface element and the user input when the distance from the previous user input is within a predetermined threshold than when the time since the previous user input exceeds the predetermined threshold.

4. The apparatus of claim 1, wherein the apparatus is configured to assign respective footprint areas according to a predefined relationship between the assigned area and at least one of the time period between the entered user input and the previous user input; and the distance between the entered user input and the previous user input.

5. The apparatus of claim 4, wherein the predefined relationship is one of linear and non-linear.

6. The apparatus of claim 1, wherein the apparatus is configured to assign respective footprint areas according to a predefined relationship in which larger footprint areas are assigned to one or more of the respective user interface element and the user input in response to determining a larger distance between the entered user input and the previous user input.

7. The apparatus of claim 6, wherein the predefined relationship is one of linear and non-linear.

8. The apparatus of claim 1, wherein the apparatus is configured to assign respective footprint areas according to a predefined relationship in which smaller footprint areas are assigned to one or more of the respective user interface element and the user input in response to determining a longer time period between the entered user input and the previous user input.

9. The apparatus of claim 8, wherein the predefined relationship is one of linear and non-linear.

10. The apparatus of claim 1, wherein the apparatus is configured to enable the selection of the user interface element by assigning the smaller footprint area to one or more of the respective user interface element and the user input when the time since the previous user input is associated with exceeding a predetermined threshold.

11. The apparatus of claim 1, wherein the apparatus is configured to enable the selection of the user interface element by assigning the larger footprint area to one or more of the respective user interface element and the user input when the distance from the previous user input does is associated with exceeding a predetermined threshold.

12. The apparatus of claim 1, wherein the apparatus is configured to determine that a user interface element has been selected when the respective footprint areas assigned to one or more of the user interface element and the user input overlap according to one or more predetermined criteria.

13. The apparatus of claim 1, wherein the footprint area assigned to at least one of the user interface element and the user input is based on the respective user input.

14. The apparatus of claim 1, wherein the footprint area assigned to at least one of the user interface element and the user input is based on the respective user interface element.

15. The apparatus of claim 1, wherein the user input is provided using a stylus on a touch screen.

16. The apparatus of claim 1, wherein at least one user interface element is one of an icon, a virtual key, and a menu item.

17. The apparatus of claim 1, wherein the apparatus comprises the graphical user interface configured to provide the user interface elements as display outputs.

18. The apparatus of claim 1, wherein the apparatus is a portable electronic device, a laptop computer, a mobile phone, a Smartphone, a tablet computer, a personal digital assistant, a digital camera, a watch, a server, a non-portable electronic device, a desktop computer, a monitor, a server, a wand, a pointing stick, a touchpad, a touch-screen, a mouse, a joystick or a module/circuitry for one or more of the same.

19. A method, the method comprising:
   enabling selection of a user interface element based on the spatial interaction between a footprint area assigned to a user input and a footprint area assigned to a user interface element, wherein one of a larger footprint area and a smaller footprint area is assigned to one or more footprints assigned to a user input and to a user interface element based on at least one of:
   the time period between the entered user input and the previous user input; and
   the distance between the entered user input and the previous user input.

20. A non-transitory computer-readable storage medium carrying one or more sequences of one or more instructions which, when executed by one or more processors, cause an apparatus to at least perform the following steps:
   enabling selection of a user interface element based on the spatial interaction between a footprint area assigned to a user input and a footprint area assigned to a user interface element, wherein one of a larger footprint area and a smaller footprint area is assigned to one or more footprints assigned to a user input and to a user interface element based on at least one of:

the time period between the entered user input and the previous user input; and the distance between the entered user input and the previous user input.

\* \* \* \* \*